US012810135B2

(12) United States Patent
Min et al.

(10) Patent No.: US 12,810,135 B2
(45) Date of Patent: Nov. 24, 2026

(54) SUPERVISED VAE FOR OPTIMIZATION OF VALUE FUNCTION AND GENERATION OF DESIRED DATA

(71) Applicant: International Business Machines Corporation, Armonk, NY (US)

(72) Inventors: Xu Min, Beijing (CN); Jing Mei, Beijing (CN); Yuan Zhang, Beijing (CN); Ze Fang Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 17/148,132

(22) Filed: Jan. 13, 2021

(65) Prior Publication Data

US 2022/0222520 A1 Jul. 14, 2022

(51) Int. Cl.
*G06N 3/08* (2023.01)
*G06F 17/18* (2006.01)

(52) U.S. Cl.
CPC ............... *G06N 3/08* (2013.01); *G06F 17/18* (2013.01)

(58) Field of Classification Search
CPC .......... G06N 3/08; G06N 3/045; G06N 3/047; G06N 3/09; G06N 3/091; G06N 3/092; G06N 3/094; G06N 3/096; G06N 3/098; G06N 3/04; G06N 3/0495; G06N 3/0455; G06N 5/025; G06N 3/0985; G06F 17/18
See application file for complete search history.

(56) References Cited

U.S. PATENT DOCUMENTS 6,188,335 B1 2/2001 Roth et al.
10,373,055 B1 8/2019 Matthey-De-L'Endroit et al.
(Continued)

FOREIGN PATENT DOCUMENTS

CN 104318303 A 1/2015
CN 108364073 A 8/2018
(Continued)

OTHER PUBLICATIONS

Gómez-Bombarelli, Rafael, et al. "Automatic chemical design using a data-driven continuous representation of molecules." ACS central science 4.2 (2018): 268-276. (Year: 2018).*
(Continued)

*Primary Examiner* — Henry Nguyen
(74) *Attorney, Agent, or Firm* — Scully, Scott, Murphy & Presser, P.C.; Monchai Chuaychoo

(57) ABSTRACT

A model learning and sample value generating framework includes a system and method to comprehensively integrate encoding, decoding and value predicting, and optimizing functions to reconstruct as accurate as possible an original input sample data space. The system leverages a variational autoencoder model to generate as realistic samples of that data space as possible. The system learns a value prediction function to achieve a target outcome based on the latent feature data instead of the original input data. Further, the system solves the optimization problem in the latent space without constraints to avoid the difficulty in optimizing in the original sample data space. The generated optimal samples are as similar as possible to the real-world input samples. The system provides a flexible data generation mechanism which is suitable for various kinds of target outcome specifications.

18 Claims, 7 Drawing Sheets

(56) References Cited

U.S. PATENT DOCUMENTS

| | | | | |
|---|---|---|---|---|
| 2017/0161635 | A1* | 6/2017 | Oono | G06N 20/00 |
| 2017/0300785 | A1 | 10/2017 | Merhav et al. | |
| 2018/0121807 | A1 | 5/2018 | Wick et al. | |
| 2019/0325995 | A1* | 10/2019 | Malone | G16H 40/20 |
| 2020/0104640 | A1 | 4/2020 | Poole et al. | |
| 2020/0233920 | A1 | 7/2020 | Meeds et al. | |
| 2020/0291489 | A1 | 9/2020 | Baumgarten et al. | |
| 2020/0293901 | A1 | 9/2020 | Wachi | |
| 2020/0342306 | A1 | 10/2020 | Giovannini et al. | |
| 2020/0356860 | A1 | 11/2020 | Soo et al. | |
| 2021/0097387 | A1* | 4/2021 | Chidlovskii | G06F 18/2155 |
| 2021/0110892 | A1* | 4/2021 | Kwon | G06N 3/092 |
| 2021/0166124 | A1* | 6/2021 | Schäfer | H04N 13/254 |
| 2021/0178585 | A1* | 6/2021 | Rozo | B25J 9/1664 |
| 2023/0004096 | A1* | 1/2023 | Middlebrooks | G03F 7/70633 |

FOREIGN PATENT DOCUMENTS

| | | | |
|---|---|---|---|
| CN | 109213805 | A | 1/2019 |
| CN | 109886388 | A | 6/2019 |
| CN | 108830292 | A | 7/2019 |
| CN | 109977945 | A | 7/2019 |
| CN | 111860759 | A | 10/2020 |
| CN | 111899844 | A | 11/2020 |
| CN | 111914991 | A | 11/2020 |
| CN | 116710927 | A | 9/2023 |
| DE | 102020101275 | A1 | 11/2020 |
| EP | 2151772 | A1 | 2/2010 |
| EP | 3798918 | A1 | 3/2021 |
| GB | 2617997 | A | 10/2023 |
| JP | 2021-056222 | A | 4/2021 |
| JP | 2024-502177 | A | 1/2024 |
| KR | 20200129458 | A | 11/2020 |
| WO | 2019/155065 | A1 | 8/2019 |
| WO | 2020/143321 | A1 | 7/2020 |
| WO | 2020173036 | A1 | 9/2020 |
| WO | 2022/152166 | A1 | 7/2022 |

OTHER PUBLICATIONS

"Interpretable Classification via Supervised Variational Autoencoders and Differentiable Decision Trees", Under review as a conference paper at ICLR 2018, https://openreview.net/pdf?id=rJhR_pxCZ, 12 pages., Feb. 16, 2018.

Jankowski, "Deep Generative Model with Supervised Latent Space for Text Classification", MATEC Web of Conferences 292, 03009 (2019), <https://doi.org/10.1051/matecconf/201929203009>, CSCC 2019, 10 pages. Jul. 17, 2019.

Keng, "Semi-supervised Learning with Variational Autoencoders", Bounded Rationality, http://bjlkeng.github.io/posts/semi-supervised-learning-with-variational-autoencoders/, Sep. 11, 2017, 20 pages.

International Search Report and Written Opinion dated Apr. 13, 2022 from related PCT/CN2022/071599.

"Generalized estimating equation", Wikipedia, retrieved from web dated Feb. 28, 2025, 4 pages.

"Generative adversarial network", Wikipedia, retrieved from web dated Feb. 28, 2025, 31 pages.

Japan Patent Office, "Decision to Grant a Patent" Feb. 28, 2025, 5 Pages, JP Application No. 2023-541691.

Kingma et al. "Auto-Encoding Variational Bayes", arXiv:1312.6114 [stat.ML], Dec. 10, 2022, 14 pages.

The State Intellectual Property Office of People's Republic of China, "First Office Action", Nov. 21, 2025, 24 Pages, CN Application No. 202280009878.4.

The State Intellectual Property Office of People's Republic of China, "Notice to Complete Registration Formalities", Jun. 19, 2026, 4 Pages, CN Application No. 202280009878.4.

The State Intellectual Property Office of People's Republic of China, "Second Office Action", Apr. 3, 2026, 10 Pages, CN Application No. 202280009878.4.

Wang et al., "Review of Natural Scene Text Detection and Recognition Based on Deep Learning", Journal of Software, 2020, vol. 31, No. 5, 32 Pages (English abstract only).

Wenhuan Li, "Application and improvement of variational autoencoder (VAE) in construction engineering material cost optimization based on big data", Journal of Computational Methods in Sciences and Engineering 2025, pp. 1-14, DOI: 10.1177/14727978251371219.

Gómez-Bombarelli et al., "Automatic Chemical Design Using a Data-Driven Continuous Representation of Molecules", arXiv, Dec. 5, 2017, 26 pages, doi: https://arxiv.org/pdf/1610.02415.

Intellectual Property India, "Examination Report", Jul. 28, 2026, 9 Pages, IN Application No. 202347045843.

* cited by examiner

400

| x* normalized | x* denormalized | mean | median | type | description |
|---|---|---|---|---|---|
| 0.8 | 1 | 0.7389 | 1 | CHARACTER | Have 80% or more full time status employees? |
| 0.1 | 0 | 0.047 | 0 | CHARACTER | Case manager |
| 0.6 | 1 | 0.455 | 0 | CHARACTER | Have 25% or more of RN staff full time equivalents (FTEs) with 2 or less years of experience? |
| 0.5 | 0 | 0.5729 | 1 | CHARACTER | Have a majority of RN staff full time equivalents (FTEs) with 5 or more years of experience? |
| 0.1 | 0 | 0.1936 | 0 | CHARACTER | Major teaching |
| 0.8 | 1 | 0.6737 | 1 | CHARACTER | Charge nurse provide clinical patient care 50% or more of the time? |
| 0.5 | 0 | 0.4701 | 0 | CHARACTER | Hire new graduates from an on site internship program? |
| 0.03588 | 4.363 | 4.2661 | 3.7307 | NUMERIC | Overtime Hours as % of Worked Hours: Non MD |
| -0.4849 | 0.947 | 1.0386 | 0.9699 | NUMERIC | AWI |
| -0.1712 | 7.78 | 9.3839 | 7.179 | NUMERIC | Skill Mix: Other Support Staff % |
| -0.2848 | 154.2 | 160.3804 | 157.41 | NUMERIC | Hospital Case Mix Index |
| -0.002909 | 3.221 | 3.2264 | 2.7545 | NUMERIC | Skill Mix: Management % |
| 0.6325 | 32.24 | 24.9079 | 24 | NUMERIC | Bed Capacity |
| -0.782 | 52.61 | 65.9401 | 66.3812 | NUMERIC | Skill Mix: RN% |
| 0.0154 | 3.7 | 3.6737 | 3.3885 | NUMERIC | Equivalent Average Length of Stay |
| -0.07487 | 1.612 | 2.0626 | 0.06895 | NUMERIC | Contract Hours Paid as % of Total Hours Paid |
| 0.989 | 34.05 | 21.9977 | 22.5678 | NUMERIC | Skill Mix: Other Patient Care % |
| -0.6632 | 10.37 | 14.9622 | 13.4905 | NUMERIC | Hours Paid per Equivalent Patient Day |
| 0.5364 | 91.49 | 89.5388 | 89.8572 | NUMERIC | Hours Worked as % of Hours Paid |
| 1.186 | 95.33 | 564.918 | 451.0203 | NUMERIC | Labor Expense per Equivalent Patient Day |

401 402 405 408 410 411 413 415 420 423 425

FIG. 4

SUPERVISED VAE FOR OPTIMIZATION OF VALUE FUNCTION AND GENERATION OF DESIRED DATA

FIELD

The present invention relates to applications of Machine Learned and Artificial Intelligence models for use solving a problem of generating optimal samples for achieving a target outcome, and leverages a variational autoencoder (VAE) model to generate as realistic samples of a data space as possible.

BACKGROUND

In artificial intelligence (AI) applications, it is very common need to generate optimal data samples as inputs used to train machine learned models to achieve specific target outcomes. For example, a healthcare provider, e.g., a hospital, needs to optimize the utilization of their resources to achieve the best hospital performance. In this case, the resource utilization "real-world" input sample data is what would be needed to optimize on while the hospital performance is the target outcome. For another example, a teacher in a primary school needs to optimize an essay to show a 100-score model essay to his/her students. Here in this case, the real-world essay input data is what needs to optimized on, and the score is the target outcome.

However, there are several challenges when generating such desired input data samples. First, the relationship between the input data sample and the output target is not predefined and needs to be learned from a large dataset. In other words, a first challenge lies in that there needs to be modeled the relationship between input data x and the output data y.

Second, the space of input x is often high-dimensional and not clearly defined. In consequence, the straightforward optimization in space x is not feasible, and it is difficult to give explicit constraints on x.

Third, the generated optimal sample space corresponding to input x is required to be as similar as possible to the real-world samples. The generated samples should be sampled from the same distribution as the real-world data, in order to keep consistence with the real-world data.

Existing related methods cannot solve all of the above three challenges simultaneously.

SUMMARY

The following summary is merely intended to be exemplary. The summary is not intended to limit the scope of the claims.

According to an aspect, the present disclosure provides for a system and a method for generating optimal data samples for a machine learned model to achieve specific target outcomes when the relationship between the input sample and the output target is not predefined and needs to be learned from a large dataset, i.e., there needs to be modeled the relationship between an input data x and the output data y.

According to a further aspect, the present disclosure provides for a system and a method for generating optimal samples for specific target outcomes when the space of input data x is high-dimensional and not clearly defined such that any straightforward optimization in space x is not feasible, and rendered difficult to give explicit constraints on x.

According to a further aspect, the present disclosure provides for a system and a method for generating optimal samples for specific target outcomes such that the generated optimal sample x* are as similar as possible to the real-world samples, i.e., the generated samples should be sampled from the same distribution as the real-world data, in order to keep consistence with the real-world data.

According to an aspect of the present invention, there is provided a computer-implemented method of generating optimal model input data for achieving a target outcome. The method comprises: generating, using an encoder model of a supervised variational autoencoder (VAE), a latent feature representation of an input data in a latent feature space; receiving a VAE decoder model to learn to reconstruct the input data using the latent feature representation of the input data; receiving a value predictor model to learn a relationship between the input data and a target outcome using the latent feature representation of the input data; concurrently training the VAE decoder and value predictor models; optimizing, using the trained value predictor model, the latent feature space representation of the input data; receiving at the trained VAE decoder model, the optimized latent feature space representation of the input data, and running the trained VAE decoder model to generate optimal samples of the input data for achieving the target outcome based on the optimized latent feature space representation of the input data.

According to one aspect, there is provided a computer system for generating optimal model input data for achieving a target outcome. The computer system comprises: a memory storage device for storing a computer-readable program, and at least one processor adapted to run the computer-readable program to configure the at least one processor to: generate, using an encoder model of a supervised variational autoencoder (VAE), a latent feature representation of an input data in a latent feature space; receive a VAE decoder model to learn to reconstruct the input data using the latent feature representation of the input data; receive a value predictor model to learn a relationship between the input data and a target outcome using the latent feature representation of the input data; concurrently train the VAE decoder and value predictor models; optimize, using the trained value predictor model, the latent feature space representation of the input data; receive at the trained VAE decoder, the optimized latent feature space representation of the input data, and run the trained VAE decoder to generate optimal samples of the input data for achieving the target outcome based on the optimized latent feature space representation of the input data.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The foregoing aspects and other features are explained in the following description, taken in connection with the accompanying drawings, wherein:

FIG. 4 depicts an example table indicating example optimal sample data input/outputs and optimized target outcome resulting from the two-stage network processing of an example resource utilization optimization problem according to embodiments of the present invention;

DETAILED DESCRIPTION

According to an embodiment, the present disclosure provides for a system and a method for rapidly and automatically generating optimal samples for a machine learned model to achieve a target outcome. A supervised variational autoencoder method is implemented to solve problems to generate optimal sample data which will bring an optimal target outcome (optimal value function).

In an embodiment, the system and method is implemented in two-stages: a learning stage and a generating stage. In the learning stage, a supervised variational autoencoder (VAE) is trained to learn both: (1) a distribution of an input data x; and (2) the relationship between the input data x and target output target y concurrently. In the generating stage, an unconstrained optimization problem is solved in the latent space z using an optimizer, to generate various data for different purposes. The system learns a value prediction function based on the latent feature instead of the original input data. The system provides a flexible data generation mechanism which is suitable for various kinds of target outcome specifications.

Figure 1:
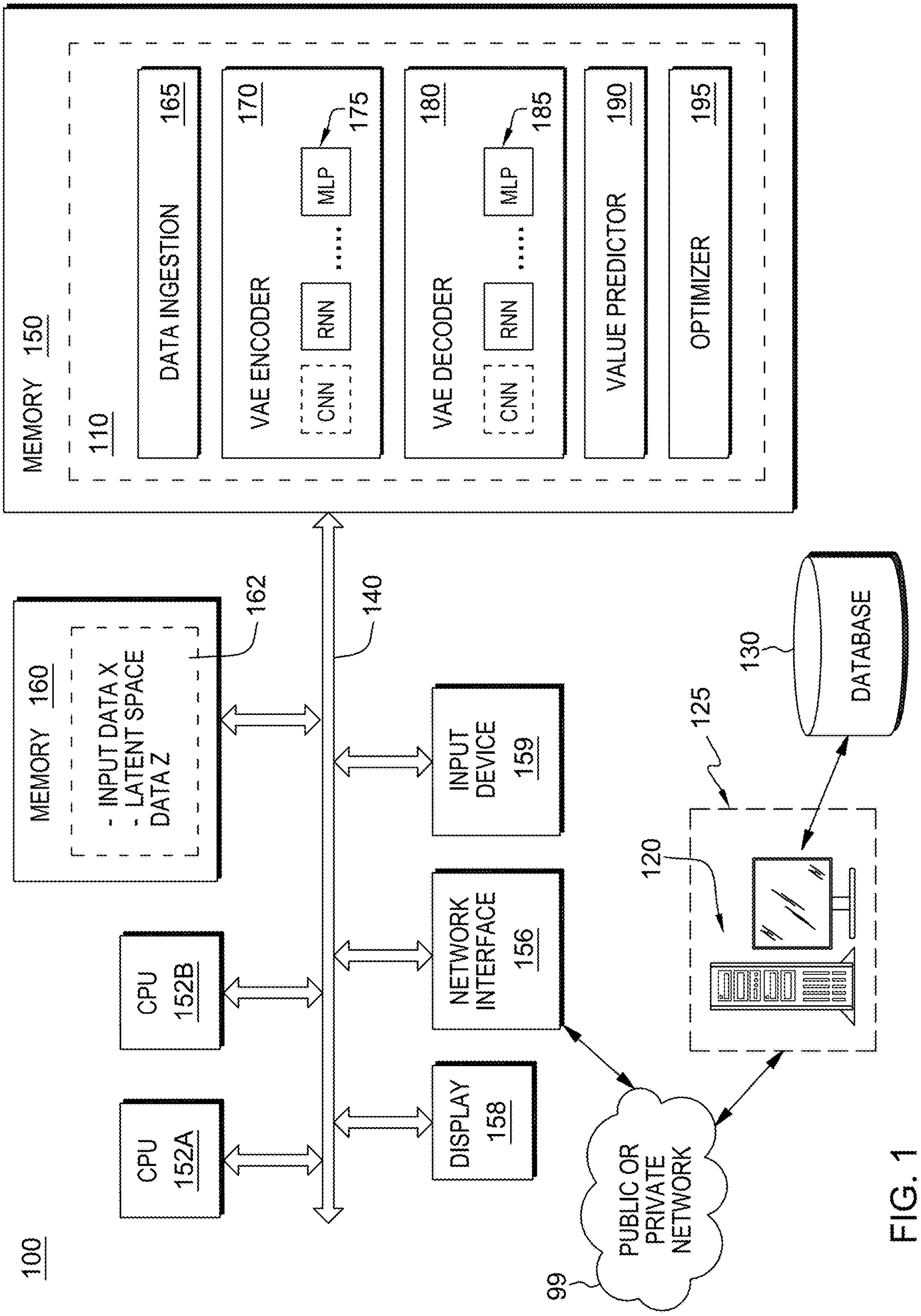
FIG. 1 schematically shows an exemplary computer system which is applicable to implement the embodiments for automatically generating optimal samples for specific target outcomes according to embodiments of the present invention.

As shown in FIG. 1, in the context of solving problems to generate optimal sample data that will result in an optimal target outcome according to one embodiment, a tool 100 implementing systems and methods is a computer system, a computing device, a mobile device, or a server. In some aspects, computing device 100 may include, for example, personal computers, laptops, tablets, smart devices, smart phones, or any other similar computing device.

Computing system 100 includes one or more hardware processors 152A, 152B, a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web- or cloud-based server 120 over a public or private communications network 99. For instance, a web-site may include input data relating to a particular domain. In an example implementation, such data may include hospital resource utilization data which may be used to solve a problem of how to minimize a labor expense of a hospital. Such data may be stored in electronic form in a database 130.

Further, as shown as part of system 100, there is provided a local memory useful for a data processing framework which may include an attached memory storage device 160, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, video bus, expansion busses, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100. In an embodiment, through the user interface, the user can enter a specific target outcome intended for the problem to be solved. For example, in the context of solving a problem relating to hospital resource utilization, the user may specify a target outcome y such as how to minimize a labor expense of a hospital.

With respect to configuring the computer system to analyze and process data to generate an optimal sample (latent)

space for building a model to generate a target output, the local or remote memory 160 may be configured for temporarily storing data or information 162 relating to the problem to be solved in the particular domain, e.g., hospital resource utilization data or other data obtained from a remote location, e.g., a web server(s).

These data is stored as a database and processed for use in generating the optimal sample space used to solve the problem at hand in a particular domain, e.g., healthcare, education, etc.

The captured data 162 can be data mined from information stored in the electronic databases 130 or other data sources (not shown). This data may alternately be stored in a separate local memory storage device attached to the computer system 100.

As shown in FIG. 1, memory 150 of computer system 100 further stores processing modules that include programmed instructions run by the processor(s) adapted to configure the computer system to provide an optimal latent sample space for use in solving a problem using VAE techniques.

In one embodiment, one of the programmed processing modules stored at the associated memory 150 include a data ingestion module 165 that provide instructions and logic for operating circuitry to access/receive data (e.g., structured or unstructured) and rendering them in a form as input data x for use by other modules that process the data according to the embodiments of the invention.

In an embodiment, a VAE encoder module 170 provides instructions and logic for operating circuitry to receive input data content relating to the problem to be solved. This data may be an n-dimensional vector of information used for a prediction problem to be solved. The VAE encoder encodes the latent attributes of the input in a probabilistic manner (distribution) thereby generating a latent sample space. The encoder (E), captures the distribution of input data x and encodes input x into a disentangled latent space z.

In an embodiment, VAE encoder module 170 can run an encoding function modeled according to a deep neural network (DNN) model pipeline architectures, including but not limited to: Convolution Neural Network (CNN), Recurrent Neural Network (RNN) or Multilayer Perceptron (MLP) model pipelines, and possible combinations and variations thereof 175 that can perform the encoding of the input data x depending upon the type of problem being solved.

Another programmed processing module stored at the associated memory 150 of system 100 includes a VAE decoder module 180 employing logic and instructions for operating circuitry providing a decoder function to reconstruct the data x based on an input latent sample space z to within an optimal degree of error. In an embodiment, the decoder (D) module 180 can run a decoding function modeled according to a deep neural network model architecture, including but not limited to: CNN, RNN, or MLP model pipelines, and possible combinations and variations thereof 185 that can perform the decoding of the input latent sample space data z depending upon the type of problem being solved.

Another processing module stored at the associated computer memory 150 includes a value predictor module 190 employing logic and instructions for operating circuitry to run a function (V) for predicting a target outcome to within a specified accuracy. In an embodiment, the value predictor module 190 also runs a deep neural network model architecture, including but not limited to: CNN, RNN, or MLP model pipelines, and possible combinations and variations thereof that are configured to predict the value of a target outcome as precisely as possible, based on the latent features space z.

Another processing module stored at the associated computer memory 150 includes an optimizer module 195 employing logic and instructions for operating circuitry to solve a specific optimization problem. The optimizer runs optimization algorithm (O) to solve an unconstrained optimization problem for generating an optimized latent sample space z* for use in obtaining the best outcome for the target outcome specified in a prediction problem being solved. The optimization algorithm can be any common algorithm such as Stochastic Gradient Descent (SGD). Several types of optimizations can be performed, the only difference among them being the optimization target formulation.

As further shown in FIG. 1, memory 150 includes a supervisory program 110 having instructions for configuring the computing system 100 to call each of the program modules and invoke operations for supervised VAE learning and generating stages that optimizes a latent sample space z* for use in obtaining the best outcome for the target outcome specified in a prediction problem being solved, i.e., generate the most optimal samples having optimal target outcome. The supervisory program configures the computer system to generate the optimum target outcome values are represented as a data value x* obtained by decoding the optimal latent sample space z*, i.e., $x^*=D(z^*)$.

Figure 2:
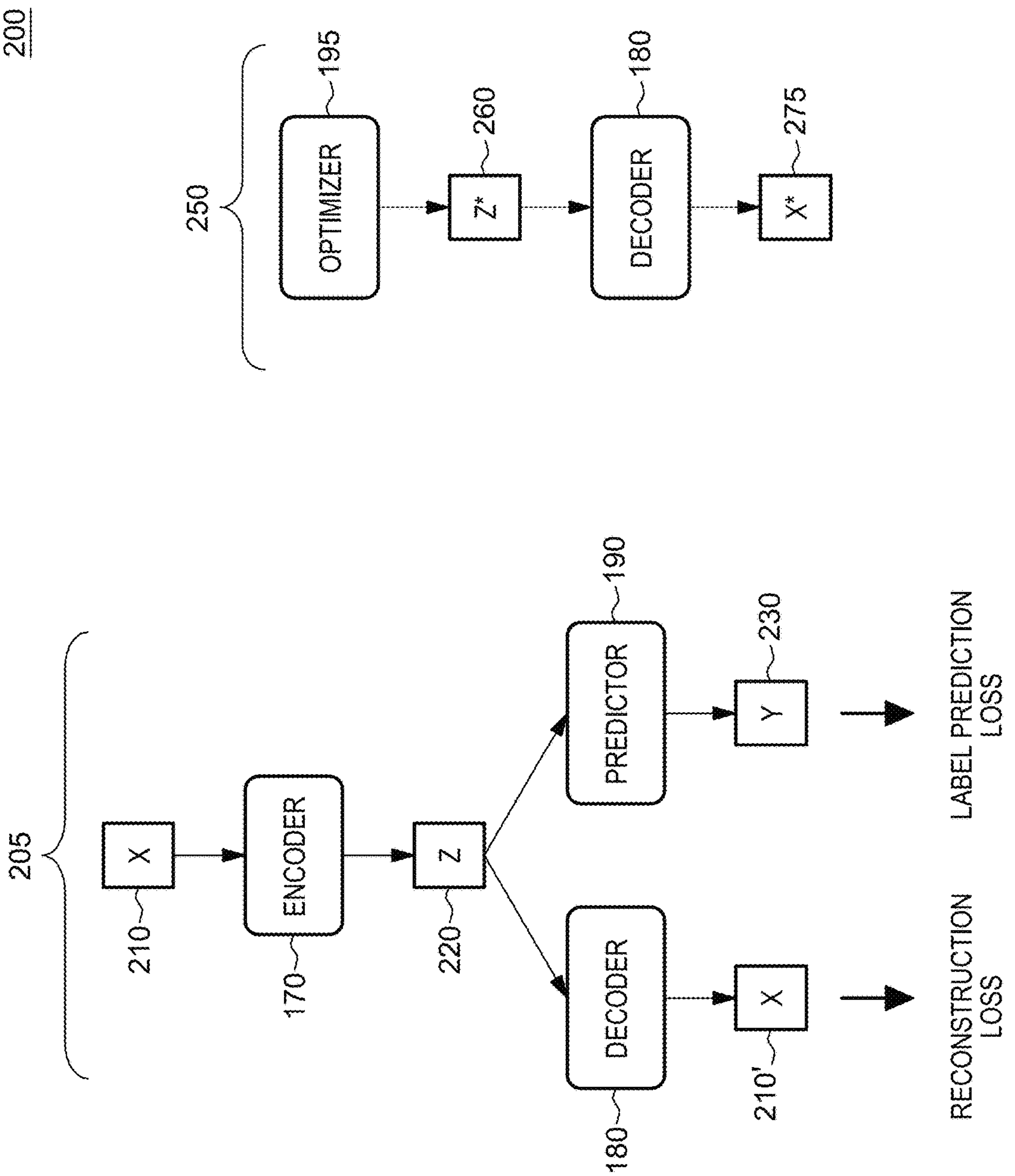
FIG. 2 depict respective system block diagrams depicting a two-stage framework for generating optimal samples for specific target outcomes according to embodiments of the present invention.

FIG. 2 depicts a system implementing a two stage framework 200 for generating optimized latent variables z* in a latent variable space z as a result of processing input data x using a supervised VAE in a first stage, and an optimizer (O) in a second stage.

In a first learning stage 205, input data x 210 in the form of one or more vectors including attributes relating to a particular problem to be solved is input to the encoder model (E) 175 of the supervised VAE. Based on the input attribute data vectors x, the encoder DNN model (E) is trained to capture the distribution of the input data x and by encoding input x into a disentangled latent variable space z, i.e., $(E(x) \rightarrow z$. The encoder takes a sample data x as input, and then generates a feature representation $z=E(x)$ in latent space 220. Depending upon the input data type x, the embodiment of the encoder function (E) can be a CNN, RNN or MLP. The benefit of encoding is to transform the input in a complex high-dimensional space into a disentangled low-dimensional latent space 220.

Continuing, as shown in FIG. 2, the decoder model 185 receives as input a sample latent space z 220 and decodes it to reconstruct the sample x 210', i.e.,$D(z) \rightarrow x$, to within some predetermined loss or error measure as determined by a loss function. Depending upon the input data type x, the embodiment of the decoder function (D) can be a CNN, RNN or MLP. As a result of the decoder model processing, the method generates the unsupervised reconstruction error loss $|D(E(x))-x|$.

Simultaneously, the value predictor model (V) 190 receives as input the same sample latent space z 220 and predicts the value of target outcome y 230 as precisely as possible, or to within a predetermined loss or error measure. Thus, besides learning the distribution of an input data x, using the latent variable space z 220, the method also learns the relationship between input data x and a target outcome output y, i.e., $x \rightarrow z \rightarrow (x, y)$, to within some predetermined loss or error measure as determined by a loss function. Depending upon the input data type x, the embodiment of the value predictor function (V) can be a CNN, RNN or MLP designed to model the relationship between the target outcome and the input data. However, it is not directly a function from x to y. It is a two-step function from x to z and then to y. This part generates the supervised prediction error loss |V(E(x))−y| for the training of VAE. Given these operations, the method can conduct downstream optimal sample generation for the target outcome.

During the training of the VAE model in the manner to predict an outcome given a sample latent space, the loss to be minimized is alternatively set forth according to equation 1) as follows:

$$\min_{D,E,V} \sum_i \|D(E(x_i)) - x_i\| + \|y_i - V(E(x_i))\| \quad (1)$$

where $\|D(E(x_i))-x_i\|$ is the loss component representing a reconstruction loss of recreating the input data x, and $\|y_i-V(E(x_i))\|$ is the loss component representing a label prediction loss.

With more particularity, in the first learning stage 205, the loss function of a supervised VAE is composed of three parts: 1) a reconstruction loss, i.e., E(log P(x|z)). This part can be further split into two parts for continuous features and discrete features; a 2) a prior loss, i.e., D_KL(Q(z|x)|P(z)). This part calculates the KL divergence distance between the posterior z|x and prior p(z); and 3) a prediction loss, i.e., E(log V(y|z)). In one embodiment, this part is the supervised loss which calculates the square error between y|z and true y. These loss functions can be customized according to specific application. That is, the method is an efficient solution to such a wide range of similar tasks, and different tasks may have different loss functions.

As further shown in FIG. 2 depicting a system implementing a two stage framework 200 for generating optimized latent variables z* in a latent variable space z as a result of processing input data x using a supervised VAE in a first stage, the second learning stage 250, runs an optimizing technique for solving an unconstrained optimization problem in the latent variable space z, and provides various data generation ways for different purposes.

In an embodiment, after the learning stage 205 is finished, in the generation stage 250, the system runs optimizing module 195 to run an optimizer used to find optimal latent space variables z* 260 for a specific target outcome.

Depending upon the specific type of optimization problem solved, a different type of optimizer is used. The only difference among the optimizers is only the optimization target formulation. The optimization algorithm can be any common algorithm such as Stochastic Gradient Descent (SGD), Adam, AdaGrad.

In an embodiment, a first type of optimizer ($O_1$) solves a global optimization defined according to:

$$z^* = \arg\max_z V(z).$$

where V(z) is the value predictor model. Using optimizer ($O_1$) the task is an unconstrained optimization to find the best sample which generates the largest target outcome value.

In a further embodiment, a second optimizer ($O_2$) solves a local optimization given a specific input data x that is defined according to:

$$z_x^* = \arg\max_Z V(z) - \gamma\|d(z)-x\|$$

where V(z) is the value predictor function, D(z) is the decoder function applied to the corresponding latent space variable z, x is the specific input data value, and γ is a coefficient for controlling impact of the regularization term ||D(z)−x||. For example, the y coefficient for controlling impact of the regularization term can be 0.1, or 0.5 or other values. Using optimizer ($O_2$) the unconstrained optimization problem is tasked to generate optimal samples more like the given input x but with larger target outcome.

In a further embodiment, a third type of optimizer ($O_3$) solves a local optimization given a target outcome value y that is defined according to:

$$z_y^* = \arg\min_z \|V(z) - y\|$$

where V(z) is the value predictor function and γ is the predicted outcome value. Using optimizer ($O_3$) the task is an unconstrained optimization problem to generate optimal samples consistent with the target outcome value y.

As a result of solving the optimization problem using any optimizer ($O_1$)−($O_3$), for each latent space variable z there is generated a corresponding optimized latent variable space z*.

Continuing in FIG. 2, the optimized latent space variables z* are input to the supervised VAE decoder 180 to generate the optimized input data variable x*, i.e., D(z*)→x*, where x* is the final generated output sample. For example, given an input vector comprising variables x for a prediction problem to be solved, after running the first and second stages, there is generated a corresponding vector of optimized input variables x*, i.e., calculated to result in an optimized target outcome y.

That is, by subsequently inputting the optimized latent space input variables z* into the value predictor function V(z*), the predictor function will generate the most optimal (best) target output value y.

Figure 3:
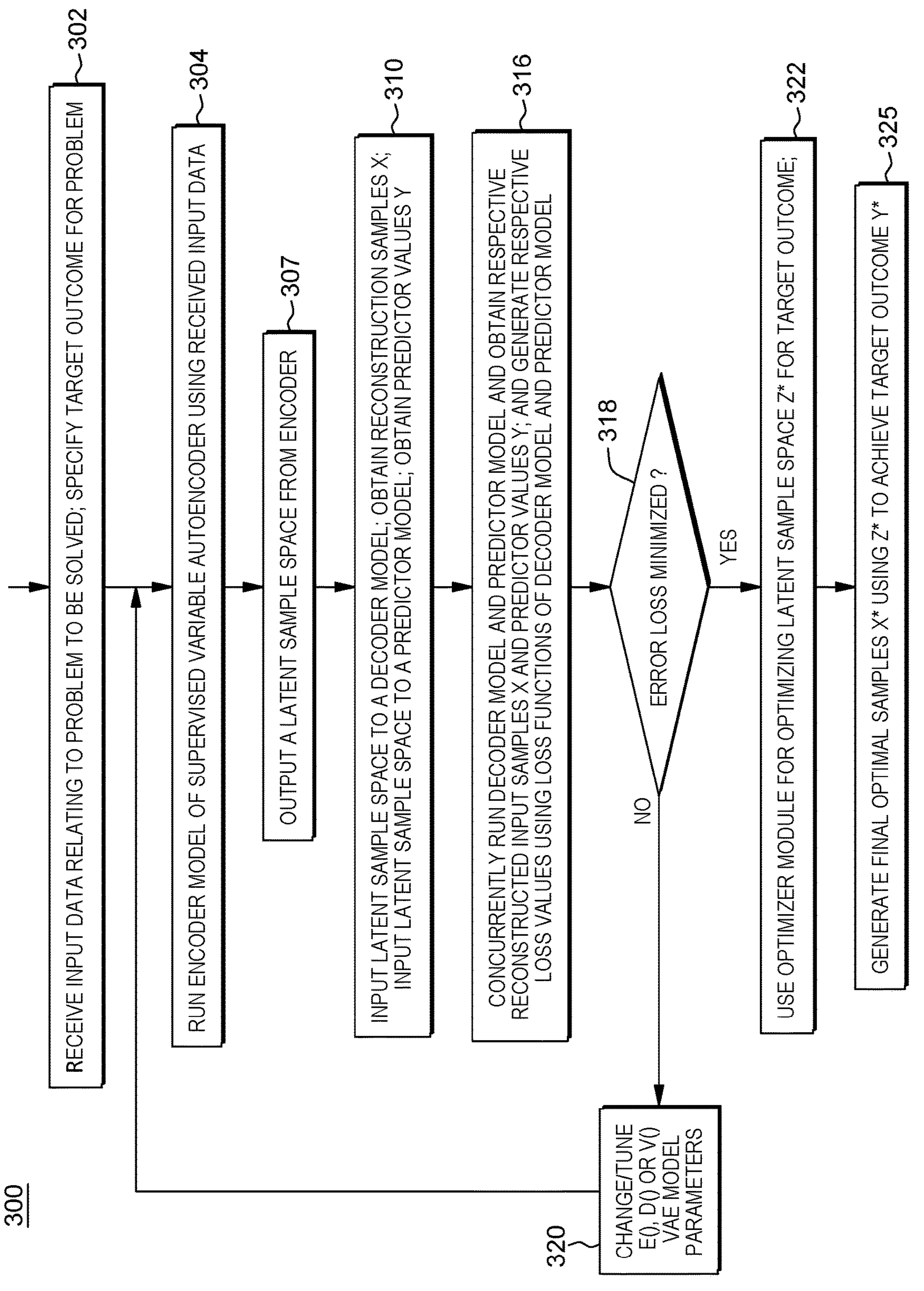
FIG. 3 shows a method invoked by the computer system for running the two-stage framework for generating optimal samples for specific target outcomes according to an embodiment.

FIG. 3 shows a method 300 implemented in the two-stage framework 200 of FIG. 2. At a first step 302, the data ingestion module receives input data relating to problem to be solved and performs and any data formatting to render it in form for use by the VAE encoder module 170. An example non-limiting problem to be solved is in the healthcare domain, particularly, a problem relating to optimizing resource utilization data x, e.g., in a manner so as to minimize labor expense cost per patient, a user-specified target outcome data y. The input data can include data from a number of hospitals, e.g., 100 hospitals. Each hospital provides input pairs of input data x and y.

For example, as shown in FIG. 4, given a healthcare provider such as a hospital, the hospital has some utilization of their resources, e.g., the number of beds, number of nurses, or some other resources. Different configurations of their resources would lead to different hospital performance. Thus, a problem to be solved would be how to optimize utilization of their resources so the hospital can obtain the best performance.

In an embodiment, the system 100 of the present invention is thus tasked to generate the optimal sample space with the best hospital resource utilization, which minimizes the labor expense of a hospital.

FIG. 4 shows a table 400 depicting the data input from each hospital including relevant resource utilization attributes data 402 (i.e., x is the real world data) that contribute to hospital expenses. In the example, received as input to the system is data relating to hospital resource usage at a number of hospitals, e.g., 100 hospitals. In an embodiment, the real-world input data 402 for each hospital is a data vector of 20 dimensions, each dimension corresponding to the hospital resource utilization attribute which is depicted as a respective row 401 as shown in the table of FIG. 4. Such data 402 from each hospital can include character type data 405, e.g., binary data having values "1" or "0" indicating, for example, whether the hospital has 80% or more full time status employees, whether the patient has a case manager, whether the hospital is a teaching hospital, or does the nurse in charge provide clinical patient care 50% or more of the time, etc. Such data 402 from each hospital can include numeric type data 408, e.g., number of overtime hours as a percentage of worked hours, an average wage index, a hospital case mix index value, a bed capacity, an equivalent average length of stay value, a value relating the hours paid per equivalent patient day, or a labor expense per equivalent patient day, etc. One of the hospital resource utilization attributes is shown at row 410 which corresponds to a target outcome value 420 intended to be optimized (minimized), i.e., labor expense per equivalent patient day.

In an embodiment, for each of the input data attribute values 402, corresponding statistic values such as a median value 411 and mean value 413 are computed based on the input data from each hospital. For example, from each of the 100 hospitals' input real-world data vector, there may be determined that the median "bed capacity" attribute 415 value is 24. The data from each hospital may be input as an m-dimensional vector, e.g., a 20-dimensional vector as shown in the hospital resource utilization example of FIG. 4. During the learning stage, the system learns the distribution of input data x.

Returning to FIG. 3, at step 302, the user further specifies the target outcome y for problem to be solved. During the learning stage, the system learns the relationship between input data x and y. In the example of FIG. 4, the target outcome of the example problem is to optimize an attribute at row 410, e.g., minimize the labor expense of a hospital. The method of FIG. 3 of the example hospital resource utilization is thus to solve the problem of determining optimal samples x* which minimize the hospital labor expense (i.e., y* generated by the value predictor function V(z*)).

Continuing to 304, FIG. 3 there is performed operations to run the VAE encoder module 170 function (E) on the received input data, e.g., the 20-dimensional data vectors from each hospital and to generate at 307 the latent sample space variables, a latent sample space z. Depending upon the task and input data type, encoder model function E( ) (and similarly D( ) and predictor V( ) functions) can be any one of MLP, CNN or RNN. For example, structural type of input data such as the 20-dimensional data vector in the hospital resource utilization example, is processed using a MLP model type encoder/decoder.

Alternatively, image type of input data will use a CNN model type encoder/decoder, where input data x is pixel data of a photograph and the target outcome y can be a score of the photo (e.g., beautifulness) of the photo.

Alternatively, time-series or sequential input data will use a RNN model type encoder/decoder. For example, in an education domain use case example, a teacher in a primary school needs to optimize an essay to show a 100-score model essay to his/her students. In such a use case, the essay is what is needed to optimize on, and the essay score is the target outcome (a 100 score essay). Given lots of essays data to capture, the relationship between the essay and a score, an optimal essay can be generated to give the 100 score. The input x* would be essays that product a 100 essay score. This would be different than a structural type data as the input data x is a sequence(s) of words and constitutes sequential data.

In an embodiment, such an encoder will reduce the dimensionality of the input sample x. For example, using a MLP model type encoder function, the output of the encoder processing transforms input dimensionality according to [20×5], i.e., reduces the 20-Dimensional data vector in the hospital example, to a 5-dimensional vector output. Using supervised training, an optimal encoder/decoder model is learned after conducting iterations as guided by minimizing the loss functions and tuning initial parameters to better reconstruct input x data and better predict target outcome value y.

Thus, at 310, in concurrent operations, the latent sample space attributes z are input to the VAE decoder module function (D) which is run at 316 to obtain output reconstructed input samples x. At 310, the latent sample space attributes z are concurrently input to a value predictor model (V) which is run at 316 to obtain output predictor value y. The decoder model can implement a [5×20] function to ensure the output dimension corresponds to the original input data x. The optimizing (e g, minimizing) of the loss function tunes the parameters in the encoder/decoder models. In the given example, the value predictor model (V) can implement a [5×1] function to ensure the output dimension corresponds to the desired target outcome y.

At 316, FIG. 3, using respective loss functions for the decoder and predictor models, respective error values are generated which are then evaluated at 318. In an embodiment, the loss function of the supervised VAE is E(log P(x|z)) where E( ) is the expectation of log of the conditional probability P(x|z), i.e., the conditional probability of $x_i$ given the latent variable z, as the autoencoder reconstructs an x as more likely to the input x. The P( ) function is defined using any particular probability distribution function, e.g., Gaussian distribution. If Gaussian distribution is used, this loss formula is transformed into the reconstruction loss function $D(E(x_i))-x_i$ II to be minimized for recreating the input data x for each data attribute i according to equation 1). In an embodiment, this reconstruction loss can be split into two parts for continuous features and discrete features.

A further prior loss to minimize the dissimilarity between two probability distributions (Q and P) according to D_KL (Q(z|x)|P(z)) is computed. That is, a KL divergence loss function to measure the distance between the posterior z|x and prior p(z) is computed where Q(z|x) is the conditional distribution of latent variable z given input data x, and which corresponds to the decoder network and P(z) is the prior distribution of the latent variable z taken as following a simple distribution, e.g., standard Gaussian distribution. This prior loss term is minimized to avoid autoencoder overfitting of the input data x.

In an embodiment, the label prediction loss for each data attribute i is computed according to E(log V(y|z)) where V( ) is a probability distribution function and V(y|z) denotes the probability of y given z. This loss term is the supervised loss which calculates the square error between y|z and true y. It is desired to maximize the expectation of log V(y|z), i.e., E(log V(y|z)). Adopting a particular distribution in VO obtains the prediction loss $\|y-V(z)\|$ or $\|y-V(E(x)\|)$ term of equation 1).

If at 318, FIG. 3, it is determined that the reconstruction loss and predictive label loss are not minimized, the process repeats by continuing to 320, FIG. 3 in order to tune E( ), D( ) or V( ) model parameters and returning to 304, FIG. 3 to again run the VAE encoder model, decoder model and predictor models to obtain respective latent space variables z, reconstructed input samples x and target predictor value y. Until the error loss is minimized without overfitting, steps 304 to 318 are repeated.

Once the error loss is minimized at 318 to within a specified accuracy, the process proceeds to 322 in order to use optimizer module 190 for optimizing the resulting latent sample space samples z* for the target outcome generated by the autoencoder, using optimization algorithm such as SGD, Adam, AdaGrad, etc. such that the samples z* are naturally similar to real-world samples. In particular, at 322, an optimization objective whose maximum or minimum value is to be found is formulated. This optimization objective formulation is problem specific. for the example hospital resource utilization example shown in FIG. 4, the optimization objective is the labor expense attribute 420 represented as predictor function V(z), and an optimization problem is defined according to the first optimizer type as minV(z), i.e., the hospital labor expense attribute to be minimized. In this example, the optimal latent space variables z are denoted as z*=arg min V(z). Depending upon the specific problem, optimization objectives for an expected target outcome may be formulated using the other types of optimizers: $z^*=\arg\max_z V(z)$ or $z_x^*=\arg\max_z V(z)-\gamma\|D(z)-x\|$, or, if a specific target outcome y is provided, $z_y^*=\arg\min_z\|V(z)-y\|$.

In the hospital resource utilization example of FIG. 4, the expected target outcome y is the hospital labor expense 420, which is the variable to be minimized according to z. That is, the optimization variables are the latent variable space. Thus, a first part of the optimization objective is about the variable y, and is solved using one of the three types of objective functions, e.g., z*=arg min V(z).

In an embodiment, for the optimal latent samples generating stage at 322, FIG. 3, the optimization objective is formulated according to equation 2) as follows:

$$\min_z V(z)-\log P(z) \tag{2}$$

where the first part 1) is the expected target outcome implementing one of the three optimizer types; and the second part 2) is a probability regularization term, i.e., the probability of the latent feature z*. This second regularization term ensures the high probability of the result z* and ensures the existence of the decoded sample, otherwise an extreme z* will lead to unrealistic sample x*. To regularize the variable z ensures that the probability of the result z* is not too small.

Finally, at 325, FIG. 3, the method generates the final optimal samples x* using z* to achieve target outcome y*. That is, decoder module 180 runs the VAE decoder model using the optimized latent sample space z* in order to generate the final optimal samples x* to achieve the target outcome. That is, at this step, to obtain x* the decoder function D( ) obtained from the learning stage is run as follows:

$$x^*=D(z^*)=D(\text{argmin } V(z))$$

The target outcome y* is obtained using the value predictor function V( ) obtained from the learning stage by computing:

$$y^*=V(E(x^*))=V(z^*))$$

Returning to FIG. 4, for the hospital resource utilization example 400, the optimized target outcome y* 420 is a minimization of the hospital's labor expense which is the value 95.33. That is, after obtaining optimal resource utilization data x*, this vector is used to guide the changes at the 100 hospitals to decrease the labor expense and decrease cost. The vector of values in the denormalized data column 425 is the optimal samples x* that would achieve this target outcome.

As shown in the example table 400 of FIG. 4, as a result of running the methods herein to build an optimal latent sample space z*, the value predictor model will obtain an optimized target outcome output y* using the normalized optimal outcome data x* 423 and a corresponding de-normalized optimal outcome data x* 425. The normalized outcome data x* 423 represents the deviation of the x* from the mean value of the input data, e.g., greater than the mean value (positive value) or less than (negative value). The de-normalized optimal outcome data x* 425 represents the best utilization values for each attribute (row) to accomplish the target outcome of minimizing the labor expense of a hospital. Thus, for a particular hospital, a best configuration of resource utilization shown in column 425 that would result in a minimizing of the labor expense of a hospital based on the original input data vectors x given for all 100 hospitals based on a target outcome of minimizing a labor expense or cost at that hospital. Based on the example 400 shown in FIG. 4, the mean value for the target attribute labor expense per equivalent patient day 420 for all 100 hospitals is $564.9. An optimal value for a hospital that minimizes the labor expense per equivalent patient day 420 is $95. The best resource utilizations at a hospital to achieve this optimal de-normalized value x* would be a configuration of hospital resources as shown at the column 425. For example, using the example hospital resource utilization example, the x* vector provides a guidance to increase bed capacity attribute 415 from a mean value 24 to a new value 32 in achieving the desired outcome of decreasing labor expense.

The learning and generating framework 100 according to embodiments herein is that system comprehensively integrates four modules, including encoding, decoding, predicting, and optimizing and leverages the supervised VAE model to generate as realistic samples as possible. The system 100 learns a value prediction function based on the latent feature instead of the original input data, which is more robust. Further, the system solves the optimization problem in the latent space without constraints, avoiding the difficulty in optimizing in the original space x. The system 100 provides a flexible data generation mechanism which is suitable for various kinds of target outcome specifications.

Figure 5:
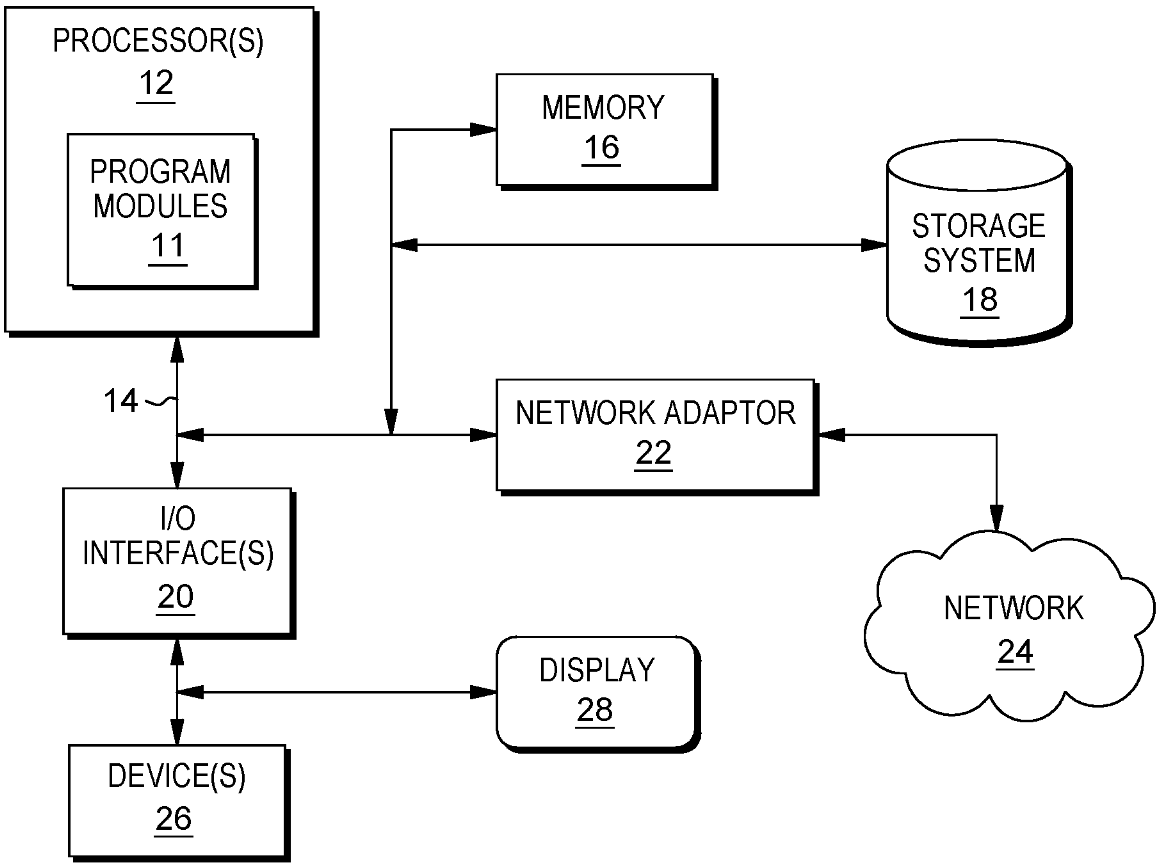
FIG. 5 illustrates a schematic of an example computer or processing system according to embodiments of the present invention.

FIG. 5 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 3).

The components of the computer system may include, but are not limited to, one or more processors or processing units 12, a memory 16, and a bus 14 that operably couples various system components, including memory 16 to processor 12. In some embodiments, the processor 12 may execute one or more modules 11 that are loaded from memory 16, where the program module(s) embody software (program instructions) that cause the processor to perform one or more method embodiments of the present invention. In some embodiments, module 11 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
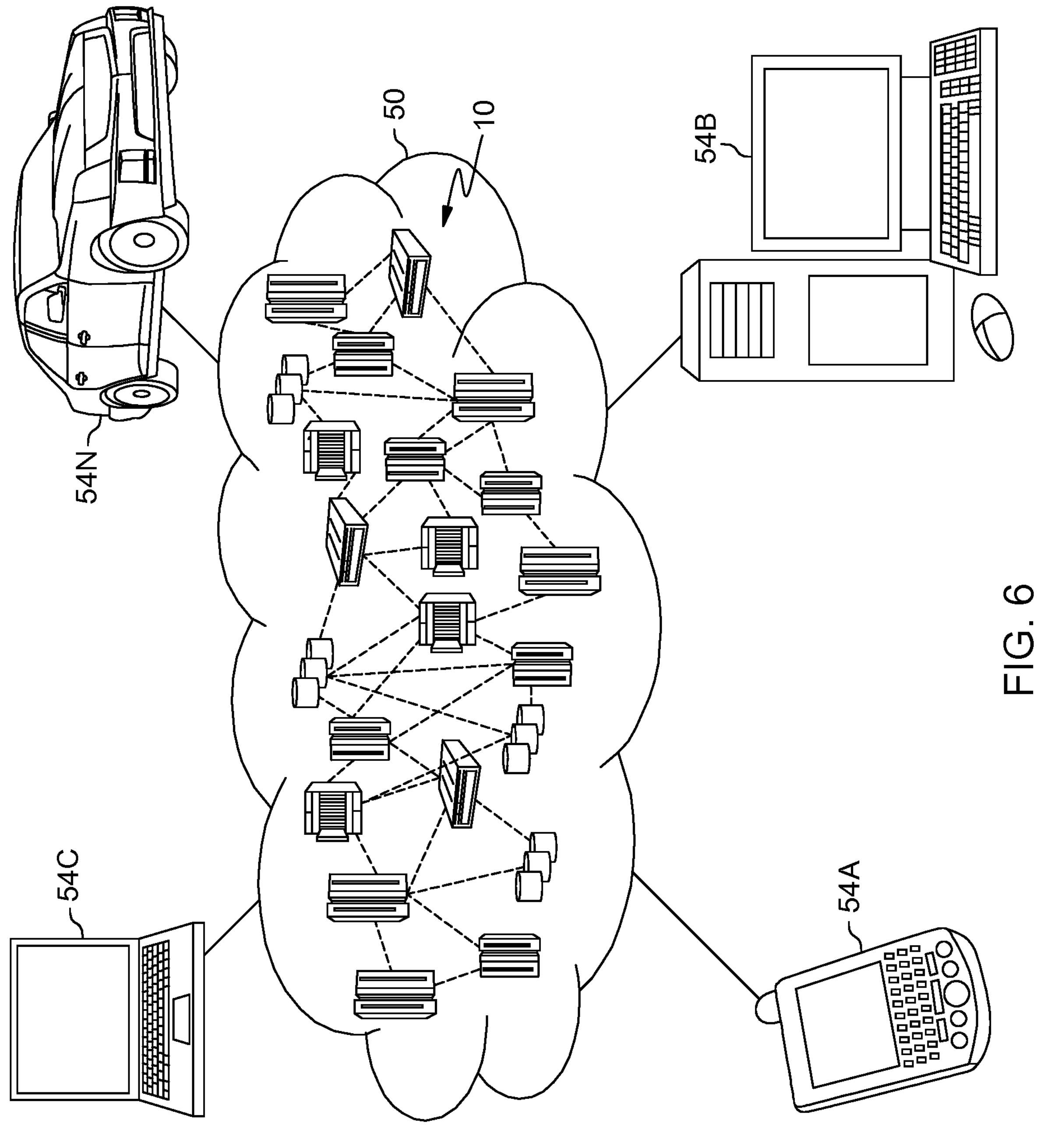
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
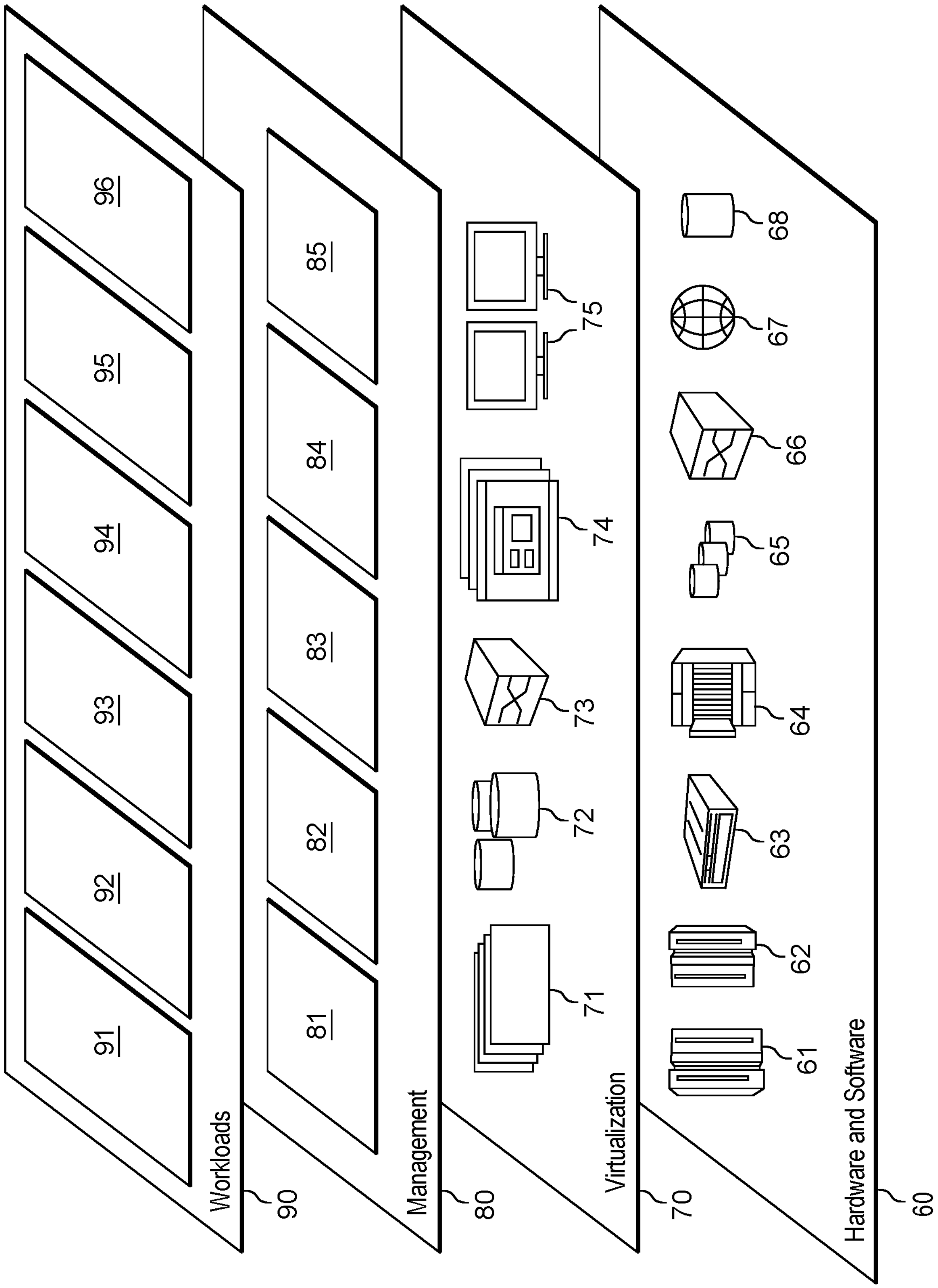
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 to automatically generating optimal samples for a target outcome according to aspects of the present disclosure.

What is claimed is:

1. A computer-implemented method of generating optimal model input data for achieving a target outcome, said method comprising:

receiving, at an encoder model of a supervised variational autoencoder (VAE) running on a programmed processor device, input data relating to a prediction problem to be solved;

generating, using the encoder model of the VAE, a latent feature representation of the input data in a latent feature space of reduced dimensionality, said encoder model trained to capture a distribution of the input data;

receiving, at a VAE decoder model running on the programmed processor device, the latent feature representation of the input data in the latent feature space and reconstructing, using the VAE decoder model, said input data using the latent feature representation of the input data and generating an unsupervised reconstruction error loss;

receiving the latent feature representation at a value predictor model running on the programmed processor device, the value predictor model trained to learn a relationship between the input data and a target outcome using the latent feature representation of the input data and generating a label prediction loss;

concurrently training said VAE decoder and value predictor models by minimizing a loss function comprising the reconstruction error loss component used in training said VAE decoder and the label prediction error loss component used in the concurrent training of said value predictor model;

forming an unconstrained optimization problem in the latent space to generate an optimized latent space representation for use in obtaining one of: a maximum target outcome, a minimum target outcome or a specific target outcome specified in the prediction problem being solved, and solving said unconstrained optimization problem, using said trained value predictor model, to generate said optimized latent feature space representation of the input data that achieves the maximum target outcome, the minimum target outcome or the specific target outcome;

receiving at said trained VAE decoder model, said optimized latent feature space representation of the input data, running said trained VAE decoder model to generate optimal samples of said input data for achieving said target outcome using said optimized latent feature space representation of the input data; and using said generated optimal samples of said input data for achieving said target outcome of the prediction problem, wherein said unconstrained optimization problem is a local optimization given a specific input data to find optimal samples like the given input data but with a larger target outcome, said local optimization to find the optimized latent feature space representation of said specific input data sample which generates the target outcome value comprising:

applying an argmax function to said value predictor model operating on the latent feature representation of the input data in the latent feature space to generate an output and modifying this output by a regularization term representing a difference between a VAE decoder output function applied to the latent feature representation of the input data in the latent feature space and the input data sample, wherein the regularization term is modified by a coefficient for controlling the impact of the regularization term.

2. The computer-implemented method of claim 1, wherein the VAE encoder, said VAE decoder and value predictor models comprise a machine-learned deep neural network model selected from: a convolutional neural network (CNN), a recurrent neural network (RNN) or a multilayer perceptron (MLP).

3. The computer-implemented method of claim 1, wherein said unconstrained optimization problem is a global optimization to find the optimized latent feature space representation of said input data sample which generates the largest target outcome value.

4. The computer-implemented method of claim 3, wherein said global optimization to find the optimized latent feature space representation of said input data sample which generates the largest target outcome value comprises: applying an argmax function to said value predictor model operating on the latent feature representation of the input data in the latent feature space.

5. The computer-implemented method of claim 1, wherein said unconstrained optimization problem is a local optimization to find the optimized latent feature space representation of said input data sample consistent with the target outcome value.

6. The computer-implemented method of claim 5, wherein said local optimization to find the optimized latent feature space representation of said input data sample consistent with the target outcome value comprises:

applying an argmin function to said value predictor model operating on the latent feature representation of the input data in the latent feature space that is modified by a given target outcome value.

7. The computer-implemented method of claim 1, wherein said unconstrained optimization problem comprises a probability regularization component to optimize a probability of the latent feature space representation.

8. The computer-implemented method of claim 1, wherein said concurrently training said VAE decoder and value predictor models by minimizing a loss function is an iterative process comprising, at each iteration: concurrently running said decoder model and predictor model to obtain a respective reconstructed input sample and predictor values and generating respective loss values using the loss function of the VAE decoder model and predictor model, evaluating the loss function, and tuning initial parameters of said VAE encoder model, decoder model and predictor model until said loss function is minimized.

9. A computer system for generating optimal model input data for achieving a target outcome, the computer system comprising:

a memory storage device for storing a computer-readable program, and at least one processor adapted to run said computer-readable program to configure the at least one processor to:

receive, at an encoder model of a supervised variational autoencoder (VAE), input data relating to a prediction problem to be solved;

generate, using the encoder model of the VAE, a latent feature representation of the input data in a latent feature space of reduced dimensionality, said encoder model trained to capture a distribution of the input data;

receive, at a VAE decoder model, the latent feature representation of the input data in the latent feature space and reconstruct, using the VAE decoder model, said input data using the latent feature representation of the input data and generate an unsupervised reconstruction error loss;

receive the latent feature representation at a value predictor model, the value predictor model trained to learn a relationship between the input data and a target outcome using the latent feature representation of the input data and generating a label prediction loss;

concurrently train said VAE decoder and value predictor models by minimizing a loss function comprising the reconstruction error loss component used in training said VAE decoder and the label prediction error loss component used in the concurrent training of said value predictor model;

form an unconstrained optimization problem in the latent space to generate an optimized latent space representation for use in obtaining one of: a maximum target outcome, a minimum target outcome or a specific target outcome specified in the prediction problem being solved, and solve said unconstrained optimization problem, using said trained value predictor model, to generate said optimized latent feature space representation of the input data that achieves the maximum target outcome, the minimum target outcome or the specific target outcome;

receive at said trained VAE decoder model, said optimized latent feature space representation of the input data, run said trained VAE decoder model to generate optimal samples of said input data for achieving said target outcome using said optimized latent feature space representation of the input data; and use said generated optimal samples of said input data for achieving said target outcome of the prediction problem, wherein said unconstrained optimization problem is a local optimization given a specific input data to find optimal samples like the given input data but with a larger target outcome, said local optimization to find the optimized latent feature space representation of said specific input data sample which generates the target outcome value comprising:

configuring the at least one processor to apply an argmax function to said value predictor model operating on the latent feature representation of the input data in the latent feature space to generate an output and modifying this output by a regularization term representing a difference between a VAE decoder output function applied to the latent feature representation of the input data in the latent feature space and the input data sample, wherein the regularization term is modified by a coefficient for controlling the impact of the regularization term.

10. The computer system of claim 9, wherein the VAE encoder, said VAE decoder and value predictor models comprise a machine-learned deep neural network model selected from: a convolutional neural network (CNN), a recurrent neural network (RNN) or a multi-layer perceptron (MLP).

11. The computer system of claim 9, wherein said unconstrained optimization problem is a global optimization to find the optimized latent feature space representation of said input data sample which generates the largest target outcome value.

12. The computer system of claim 9, wherein said unconstrained optimization problem is one selected from: a local optimization to find the optimized latent feature space representation of said input data sample consistent with the target outcome value, or a local optimization given a specific input data to find optimal samples like the given input data but with a larger target outcome.

13. The computer system of claim 9, wherein said unconstrained optimization problem comprises: a probability regularization component to optimize a probability of the latent feature space representation.

14. The computer system of claim 9, wherein to concurrently train said VAE decoder and value predictor models by minimizing a loss function comprises an iterative process comprising, at each iteration: concurrently running said decoder model and predictor model to obtain a respective reconstructed input sample and predictor values and generating respective loss values using the loss function of the VAE decoder model and predictor model, evaluating the loss function, and tuning initial parameters of said VAE encoder model, decoder model and predictor model until said loss function is minimized.

15. A computer program product, the computer program product comprising a computer-readable storage medium having a computer-readable program stored therein, wherein the computer-readable program, when executed on a computer including at least one processor, causes the at least one processor to:

receive, at an encoder model of a supervised variational autoencoder (VAE), input data relating to a prediction problem to be solved;

generate, using the encoder model of the VAE, a latent feature representation of the input data in a latent feature space of reduced dimensionality, said encoder model trained to capture a distribution of the input data;

receive, at a VAE decoder model, the latent feature representation of the input data in the latent feature space and reconstruct, using the VAE decoder model, said input data using the latent feature representation of the input data and generate an unsupervised reconstruction error loss;

receive the latent feature representation at a value predictor model, the value predictor model trained to learn a relationship between the input data and a target outcome using the latent feature representation of the input data and generate a label prediction loss;

concurrently train said VAE decoder and value predictor models by minimizing a loss function comprising the reconstruction error loss component used in training said VAE decoder and the label prediction error loss component used in the concurrent training of said value predictor model;

form an unconstrained optimization problem in the latent space to generate an optimized latent space representation for use in obtaining one of: a maximum target outcome, a minimum target outcome or a specific target outcome specified in the prediction problem being solved, and solve said unconstrained optimization problem, using said trained value predictor model, to generate said optimized latent feature space representation of the input data that achieves the maximum target outcome, the minimum target outcome or the specific target outcome;

receive at said trained VAE decoder model, said optimized latent feature space representation of the input data, run said trained VAE decoder model to generate optimal samples of said input data for achieving said target outcome using said optimized latent feature space representation of the input data; and use said generated optimal samples of said input data for achieving said target outcome of the prediction problem, wherein said unconstrained optimization problem is a local optimization given a specific input data to find optimal samples like the given input data but with a larger target outcome, said local optimization to find the optimized latent feature space representation of said specific input data sample which generates the target outcome value comprising:

configuring the at least one processor to apply an argmax function to said value predictor model operating on the latent feature representation of the input data in the latent feature space to generate an output and modifying this output by a regularization term representing a difference between a VAE decoder output function applied to the latent feature representation of the input data in the latent feature space and the input data sample, wherein the regularization term is modified by a coefficient for controlling the impact of the regularization term.

16. The computer program product of claim 15, wherein said unconstrained optimization problem is a global optimization to find the optimized latent feature space representation of said input data sample which generates the largest target outcome value.

17. The computer program product of claim 15, wherein said unconstrained optimization problem is one selected from: a local optimization to find the optimized latent feature space representation of said input data sample consistent with the target outcome value, or a local optimization given a specific input data to find optimal samples like the given input data but with a larger target outcome.

18. The computer program product of claim 15, wherein said unconstrained optimization problem comprises: a probability regularization component to optimize a probability of the latent feature space representation.

* * * * *